(12) United States Patent
Baird (10) Patent No.: US 7,267,769 B2
(45) Date of Patent: Sep. 11, 2007

(54) WATER PURIFICATION SYSTEM UTILIZING A CARBON BLOCK PRE-FILTER

(75) Inventor: Michael T. Baird, Temecula, CA (US)

(73) Assignee: International Environmental Technologies, LLC, Oceanside, CA (US)

(*) Notice: Subject to any disclaimer, the term of this patent is extended or adjusted under 35 U.S.C. 154(b) by 335 days.

(21) Appl. No.: 10/949,127

(22) Filed: Sep. 24, 2004

(65) Prior Publication Data
US 2006/0065601 A1  Mar. 30, 2006

(51) Int. Cl.
*B01D 63/00* (2006.01)
*B01D 33/46* (2006.01)
*B01D 24/00* (2006.01)
*C02F 9/00* (2006.01)
*C02F 3/28* (2006.01)

(52) U.S. Cl. .................. 210/257.2; 210/261; 210/266; 210/283; 210/264; 210/321.83; 210/321.86; 210/232; 210/487

(58) Field of Classification Search ............. 210/257.2, 210/261, 652, 266, 283, 321.83, 321.86, 210/232, 263, 264, 487
See application file for complete search history.

(56) References Cited

U.S. PATENT DOCUMENTS

| | | |
|---|---|---|
| 3,504,796 A | 4/1970 | Bray |
| 3,542,199 A | 11/1970 | Bray et al. |
| 4,609,463 A | 9/1986 | Macevicz et al. |
| 4,711,723 A | 12/1987 | Bray |
| 4,713,175 A | 12/1987 | Bray |
| 4,842,724 A | 6/1989 | Bray et al. |
| 5,102,542 A * | 4/1992 | Lawrence et al. .......... 210/264 |
| 5,151,180 A * | 9/1992 | Giordano et al. .......... 210/264 |
| 5,160,038 A * | 11/1992 | Harada et al. .............. 210/149 |
| 5,221,473 A | 6/1993 | Burrows |
| 5,269,919 A * | 12/1993 | von Medlin ................. 210/256 |
| 5,296,148 A | 3/1994 | Colangelo et al. |
| 6,024,867 A * | 2/2000 | Parise .......................... 210/87 |
| 6,190,558 B1 | 2/2001 | Robbins et al. |
| 6,436,282 B1 * | 8/2002 | Gundrum et al. ........... 210/117 |
| 6,569,329 B1 * | 5/2003 | Nohren, Jr. ................. 210/282 |
| 6,861,002 B2 * | 3/2005 | Hughes ....................... 210/681 |
| 6,986,843 B2 * | 1/2006 | Tochikubo et al. .......... 210/287 |

* cited by examiner

Primary Examiner—Ana Fortuna
(74) Attorney, Agent, or Firm—The Maxham Firm (57) ABSTRACT

A water purification system includes an activated carbon filter and a reverse-osmosis (RO) filter. The activated carbon filter is typically formed with a central aperture that receives an upper portion of a central tube. The RO filter, which is positioned downstream from the carbon filter, may be formed around a perforated section of the central tube. The system further includes a head that is structured to receive a sump that contains the carbon and RO filters, as well as the central tube. An inlet formed in the head enables unpurified feed water to flow into the carbon filter. A first channel, which is defined by an annular surface formed in the carbon filter and an outer surface of the central tube, enables water to flow into the RO filter. A channel within the central tube enables water to flow from the RO filter, through the perforated sections of the central tube, and into an outlet formed within the head.

21 Claims, 7 Drawing Sheets

WATER PURIFICATION SYSTEM UTILIZING A CARBON BLOCK PRE-FILTER

BACKGROUND OF THE INVENTION

1. Field of the Invention

The present invention relates generally to a water purification system, and in particular to a two-stage reverse-osmosis filtering process utilizing a carbon block pre-filter.

2. Discussion of the Related Art

Reverse osmosis units have been used for many years to purify water for residential, municipal, and industrial uses. Some systems are self-contained and are generally designed to provide potable water on demand by being connected to a municipal water supply line. These systems create a ready reservoir of purified or potable water which would be available to be dispensed to a user, either by gravity flow or by flow driven by the expansion of air compressed behind a bladder within a confined tank. Other systems are designed to rest on the countertop or attach directly to a water faucet.

Reverse-osmosis membrane separation devices generally function on the basis of employing a significant fluid pressure difference between the inlet side of the membrane barrier, often referred to as the feed side, and the opposite side of the membrane barrier, which is known as the product side. This pressure difference motivates the flow of fluid through the micropores of the membrane barrier while generally preventing the passage of salt and mineral solutes through the membrane. In some small scale or domestic appliance-type membrane separation systems, a liquid accumulation reservoir or tank is provided into which the desired permeate discharge from the membrane purification unit is directed. Such a tank provides for rapid dispensing of a fairly large quantity of product liquid at the tap or other point of use. Moreover, because the tank or reservoir can be repeatedly filled to its desired capacity during periods of water non-use, this arrangement permits the use of a small, economical membrane separation device having only a relatively low, direct, product flow rate. Various systems have been developed to increase the efficiency and effectiveness of reverse osmosis units, but the search for improvement is continuing.

SUMMARY OF THE INVENTION

A water purification system includes an activated carbon filter and a reverse-osmosis (RO) filter. The activated carbon filter is typically formed with a central aperture that receives an upper portion of a central tube. The RO filter, which is positioned downstream from the carbon filter, may be formed around a perforated section of the central tube. The system further includes a head that is structured to receive a sump that contains the carbon and RO filters, as well as the central tube. An inlet formed in the head enables unpurified feed water to flow into the carbon filter. A first channel, which is defined by an annular surface formed in the carbon filter and an outer surface of the central tube, enables water to flow into the RO filter. A channel within the central tube enables water to flow from the RO filter, through the perforated sections of the central tube, and into an outlet formed within the head.

BRIEF DESCRIPTION OF THE DRAWING

The above and other aspects, features, and advantages of the present invention will become more apparent upon consideration of the following description of preferred embodiments, taken in conjunction with the accompanying drawing figures, wherein.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

As used herein, the term "downstream" denotes the direction of flow of water through the system, while "upstream" denotes a direction through the system that is opposite to the flow. The term "feed water" refers to unpurified water introduced to the system, and the term "permeate" denotes purified water which has been filtered by the RO filter. The term "concentrate" is used herein to refer to the unpurified water or brine generated as a result of the filtering process provided by the RO filter.

Various water channels, ducts, apertures, and tubes have been enlarged relative to the surrounding structures for clarity and ease of illustration. In practical applications, these water passages are typically much smaller than illustrated in the figures. In addition, various arrows have been used to indicate the general direction of flow of the water through the system.

Figure 1:
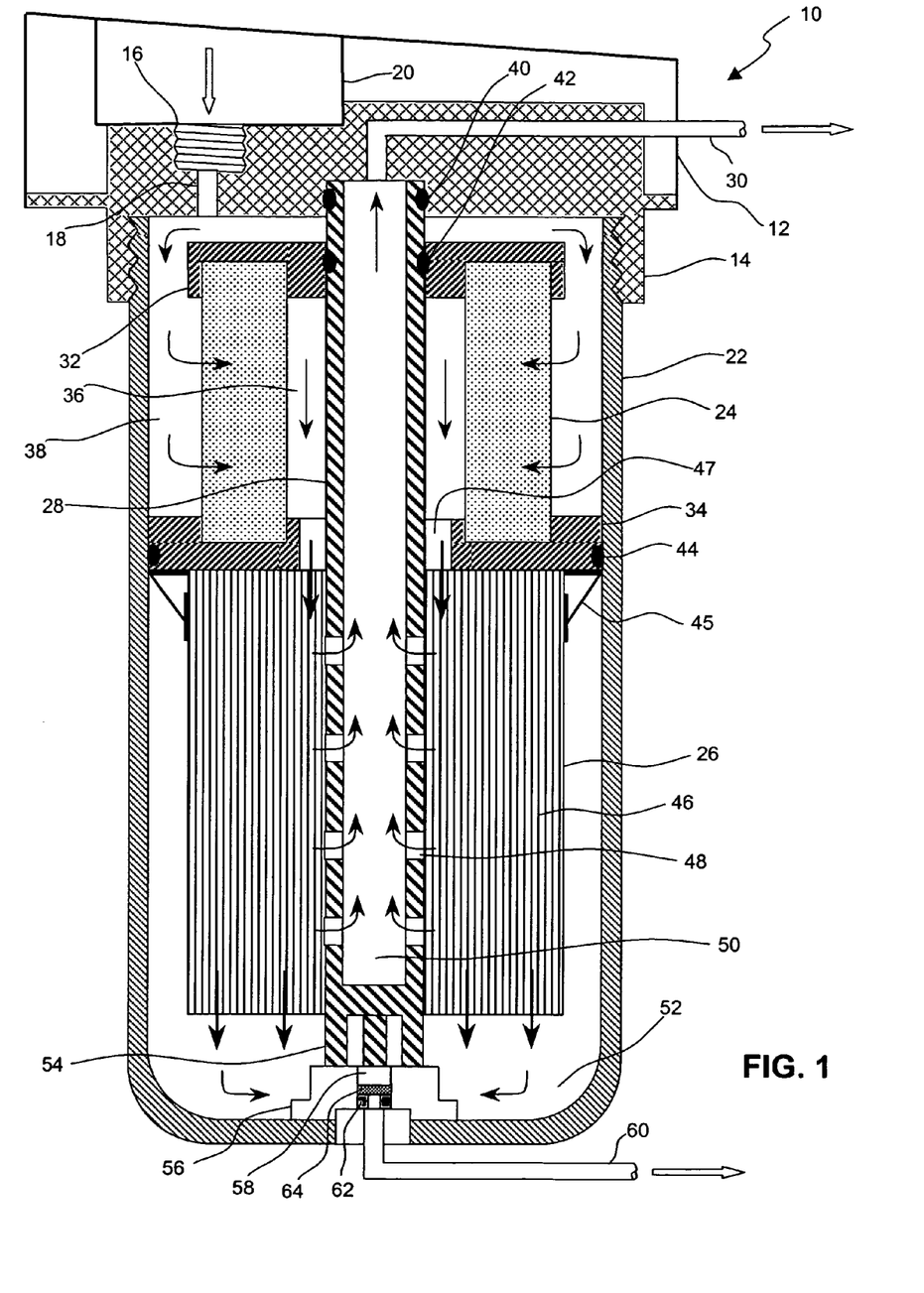
FIG. 1 is a cross-sectional view of a water purification system according to an embodiment of the present invention.

Referring now to FIG. 1, a cross-sectional view of one embodiment of water purification system 10 of the present invention is shown. System 10 includes optional removable head cover 12, which partially encloses head 14. Unpurified feed water may be introduced to the system via threaded inlet 16 and feed tube 18. Access to the inlet is provided by recess 20.

Sump 22, which is commonly referred to as a pressure vessel, comprises a cylindrically shaped, watertight housing having a cavity containing various filtration components. The sump may be removably coupled to the head using known techniques, and contains one or more water filters such as carbon filter 24 and reverse-osmosis (RO) filter 26. A lower portion of central tube 28 is shown in contact with spirally wrapped RO filter 26, and an upper portion of the central tube extends through an axial opening formed in carbon filter 24. The central tube is closed at the bottom end, but has an opening at the top end leading to outlet 30. The outlet provides for the outflow of purified water, also referred to herein as permeate. Typically, outlet 30 is coupled to a liquid accumulation reservoir or tank (not shown) which serves as a storage container for the permeate discharge. The specifics of the permeate storage container is not essential to the invention and need not be further described.

Positioning of carbon filter 24 relative to the central tube may be accomplished using the appropriate structures such as top cap 32 and bottom cap 34, but other suitable securing means can be used. Both the top and bottom caps are sized to receive carbon filter 24. This arrangement secures the carbon filter within the interior cavity of sump 22 and creates proximal channel 36 and distal channel 38. The carbon filter may be coupled to the top and bottom caps using any technique which will provide a substantially leak-proof coupling under the operational pressure of the system. That is, feed water should only flow radially inwardly through the carbon block, and no water should pass between the carbon filter and the top and bottom caps. The top and bottom caps may be coupled to the carbon filter using an adhesive or by thermally attaching these structures. Another alternative is to size these structures so that they form a frictionally tight coupling.

If desired, one or more rubber or elastomeric O-ring gaskets may be used to prevent the mixing of water during various stages of filtration. For example, O-ring 40 may be positioned on the upper portion of central tube 28, adjacent to a defined interior surface of head 14. O-ring 40 facilitates the coupling of the central tube with the head and prevents feed water from mixing with permeate. Similarly, O-ring 42 may be positioned on the central tube, adjacent to top cap 32, further securing the relative positioning of the carbon filter and central tube. O-ring 42 prevents feed water from mixing with water filtered by carbon filter 24. O-ring 44 is positioned around an outside surface of bottom cap 34, contacting the interior wall of sump 22. Similar to O-ring 42, O-ring 44 also prevents feed water from mixing with water filtered by carbon filter 24. If desired, RO filter 26 may further include chevron seal 45, which contacts a bottom surface of bottom cap 34. The chevron seal prevents water filtered by carbon filter 24 from mixing with unpurified water that was unable to pass through the RO Filter.

Carbon filter 24 may be implemented using conventional carbon filtering devices. In general, the carbon filter should contain sufficient amounts of activated carbon or charcoal which removes a desired level of chlorine from the feed water. In a non-limiting example, the carbon filter may be filled with approximately 20 to 80 grams of activated carbon having a particulate size between about 0.01 microns and about 50 microns and a pore size of approximately 1-50 microns.

RO filter 26 may be constructed using known reverse-osmosis filtering materials. For instance, the RO filter may include a spiral-wound thin film membrane 46 having small microspores that allow only small pure water molecules to pass though apertures 48 to interior 50 of the central tube. Specifically, membrane 46 may include an envelope formed by a porous material between two layers of a reverse-osmosis semipermeable membrane, with the envelope being spirally wound about the central tube with a separator grid separating adjacent envelopes. In accordance with some embodiments, membrane 46 includes between about 2 $cm^2$ and about 10 $cm^2$ of semipermeable membrane surface area per cubic centimeter of volume of the RO filter.

During operation, pure water passes radially inwardly through membrane 46 at a relatively slow rate (as compared to the flow rate of normal household tap water) toward central tube 28. Simultaneously, a portion of the feed water introduced into the system, along with the contaminates, are unable to pass through membrane 46 and therefore flow axially downwardly through the porous material and enter bottom 52 of sump 22. System pressure forces the feed water downward through the RO filter at a sufficient flow rate to carry with it the contaminates left behind, resulting in unpurified water accumulating in the bottom of the sump.

The bottom portion of central tube 28 is shown having support partitions 54 which are in contact with support 56. These partitions have openings which allow concentrate to flow from the bottom of the sump, through outlet 58, where it is discharged into discharge outlet 60. Sump pressure is maintained and controlled by the size of the inside diameter and length of outlet 58. In accordance with some embodiments, flow restrictor 62 is positioned within outlet 58, providing the necessary back pressure for proper concentrate discharge. The concentrate may be filtered using optional mesh screen 64 positioned upstream of the flow restrictor. The mesh screen filters particulates which may otherwise lodge in the relatively narrower channel formed by the flow restrictor. The flow restrictor, the mesh screen, or both of these structures, may be integrated with the sump housing. Alternatively, one or both of these structures may be removable to allow a user to service the system. The various structural components of the system, such as the head cover, head, top and bottom caps, central tube, and the sump may be formed using almost any type of rigid, or effectively rigid, plastic or molding material such as polypropylene or acrylonitrile butadiene styrene (ABS).

Operation of water purification system 10 may proceed as follows. Referring still to FIG. 1, unpurified feed water is introduced to the system via a pressurized water source such as a household faucet (not shown in this figure) coupled to inlet 16. The feed water flows into feed tube 18 and flows downwardly into distal channel 38, and is forced radially inwardly through carbon filter 24. The carbon filter will typically remove contaminates such as chlorine, tastes, odors, heavy metals, volatile organic compounds (VOCs), cysts, and the like. The chlorine filtering carbon filter is positioned upstream of the RO filter to protect the RO filter from any damage that may result from contact with chlorine or other contaminates. This arrangement extends the useful life of the RO filter beyond that which would be possible without the carbon block pre-filter.

The filtered feed water flows into proximal channel 36 and is forced downwardly through aperture 47, into membrane 46 of the RO filter. Water is forced by pressure through the porous material of the membrane, while the semipermeable portions of the membrane prevent dissolved materials from passing through. The purified waters travels in a spiral path to the interior of membrane 46, exiting through openings present in central tube 28, such as perforations or apertures 48. The purified water continues flowing upwardly through the interior of the central tube, and ultimately exiting the system through outlet 30. Simultaneously, a portion of the unpurified water flows downwardly between the windings of membrane 46, carrying the impurities into bottom 52 of the sump. Typically, the accumulated concentrate passes out of the system via outlet 58 and outlet 60. Any large particles which might pass through membrane 46 or which might be formed over a period of time by the reverse-osmosis process may be trapped by optional mesh screen 64.

Figure 2:
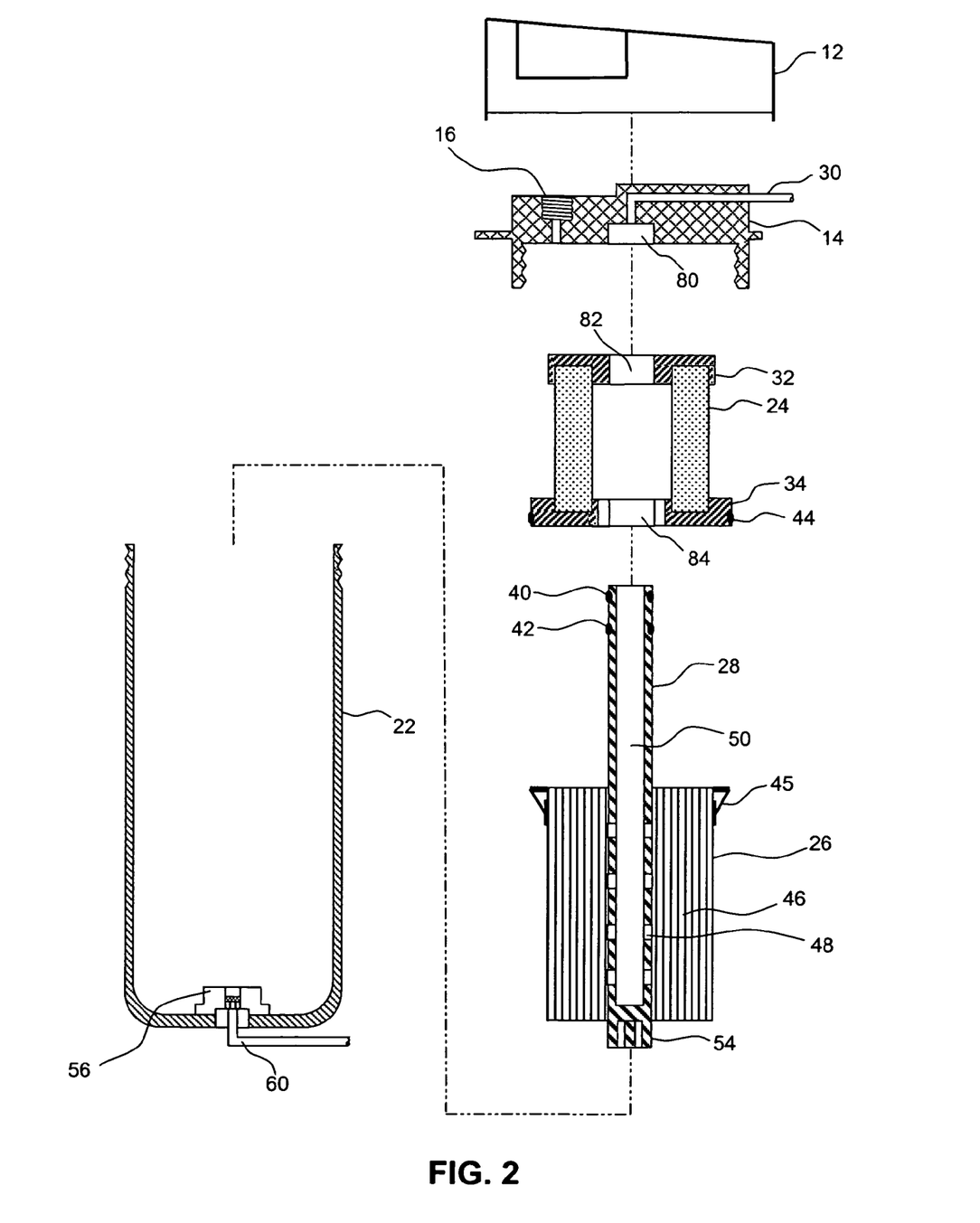
FIG. 2 is an exploded cross-sectional view of the various components comprising the water purification system shown in FIG. 1.

FIG. 2 is an exploded cross-sectional view of the various components comprising water purification system 10. Head cover 12 is shown removed from its location on head 14, while carbon filter 24 has been separated from central tube 28. This figure shows cavity 80 formed in the head, adjacent outlet 30. Cavity 80 is sized to receive the top portion of the central tube. Top cap 32 has a centrally located aperture 82 and bottom cap 34 has a centrally located aperture 84. Each of these apertures is designed to receive the central tube.

Typically, carbon filter 24 and RO filter 26 are discrete components. Replacing either of these filters may easily be accomplished by unscrewing the sump from head 14 and removing the worn filter. To replace only the carbon filter, it is not necessary, although possible, for the user to additionally remove the RO filter and the attached central tube. This configuration simplifies the carbon filter replacement process. Moreover, since the carbon and RO filters may be discrete components, consumers only have to replace the worn filter, either the carbon filter or the RO filter, not both filters as is commonly required in conventional systems. Accordingly, consumers will not be forced to prematurely replace an otherwise functioning, and costly, RO filter whenever the replacement of the carbon filter is required.

Yet another advantage that may be realized by configuring the carbon and RO filters as discrete components is that either of these filters may be removed from the sump whenever the function of that particular filter is no longer required or desired. The removed filter may be stored for later use, thus prolonging the effective overall life of the filter.

Several embodiments of the water purification system have been described, but additional variations are possible and within the teachings of the present disclosure. For example, the relative size of carbon filter 24 and RO filter 26 may be adjusted to satisfy a particular requirement. A larger carbon filter, and a correspondingly smaller RO filter, may be useful in areas subjected to heavily chlorinated water. Conversely, a smaller carbon filter and a correspondingly larger RO filter may be sufficient in areas having lower levels of chlorination. Note further that while it may be economically beneficial for the carbon filter and RO filter to be discrete components, these components may alternatively be integrated to form a single structure.

As another example, the carbon filter may be omitted leaving only RO filter 26 as the sole filtering component. In this embodiment, the RO filter would typically have a longer length than currently shown in FIGS. 1 and 2, and would extend and cover a substantial portion of the exterior of central tube 28. Specifically, a suitable RO filter would extend from the bottom of the central tube to somewhere between O-ring gaskets 40 and 42. This single filter design may be implemented whenever the pre-filtering capabilities of the carbon block filter are no longer needed or desired (for example, the feed water does not contain undesirable levels of chlorine or such water has been pre-filtered by another filtration component).

Another embodiment omits RO filter 26 from the system, leaving carbon filter 24 as the only filtering component. Similar to the single RO filter embodiment, this single carbon filter embodiment would typically require a longer carbon filter than currently shown in the figures. An appropriately sized carbon filter would extend from the bottom of the central tube to somewhere between O-ring gaskets 40 and 42.

In accordance with other embodiments, carbon filter 24, RO filter 26, and extended lengths of these filters, may individually or collectively be replaced with other types and sizes of water filters to adapt to varying water conditions or to satisfy consumer's varying needs. Examples of such alternative filters include hollow fiber filters and sediment filters. Hollow fiber filters efficiently remove biological contaminants, while sediment filters remove unwanted particulate matter. These embodiments will be described in more detail in conjunction with FIGS. 5 and 6.

System 10 has been described as utilizing top and bottom caps 32 and 34 to structurally position carbon filter 24 within the sump. An alternative is to form the carbon filter so that its shape effectively includes the structure and functionality of the top and bottom caps. Alternatively, top and bottom caps 32 and 34 may each be formed using the same or similar materials that are used to form carbon filter 24.

Figure 3:
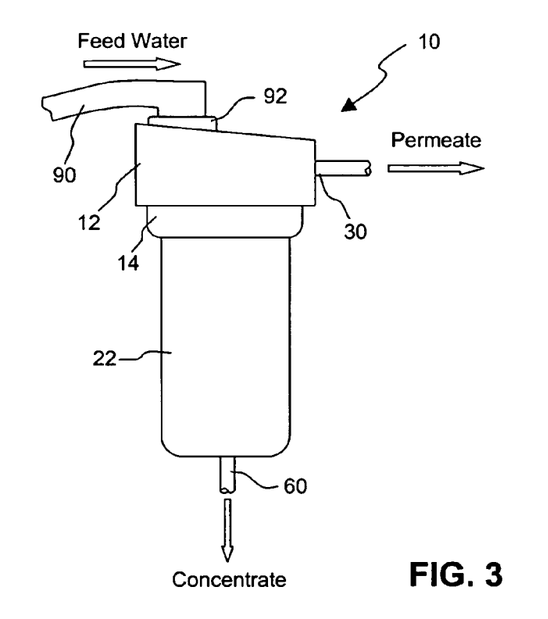
FIG. 3 is side view of the water purification system of FIG. 1 coupled with a conventional household faucet.

FIG. 3 is side view of water purification system 10 operating in conjunction with a conventional household faucet 90. The system is shown removably coupled to the faucet using, for example, quick disconnect coupling 92. The coupling will include the necessary structure to fluidly couple the faucet and head 14. An appropriate coupling includes a threaded structure that cooperates with threaded inlet 16 (FIGS. 1 and 2). During operation, the faucet supplies the feed water, which is filtered according to the filtration process previously described, resulting in the separate discharge of the permeate and unpurified concentrate.

In some embodiments, the system is designed to operate with a conventional residential or commercial faucet positioned over a sink or basin. As such, the overall size of water purification system 10 would optimally enable a user to directly mount the system to the faucet without having to make alterations to the sink or faucet. To accommodate these size limitations, system 10 may be constructed in such a manner that it has an overall length, extending from the top of head cover 12 to the bottom of sump 22, anywhere from about 5 inches to about 11 inches. Such an embodiment will be referred to herein as a "faucet mounted" system.

As an alternative to the faucet mounted design, the system may be configured to filter water received from other types of water sources using, for example, an under-counter (UC) system. Specifically, water purification system 10 may be modified from that shown in FIGS. 1-3 so that it can be mounted under the counter or at some other remote location. An under-counter system may, in some instances, require modification of the head and head cover, as will now be described.

Figure 4:
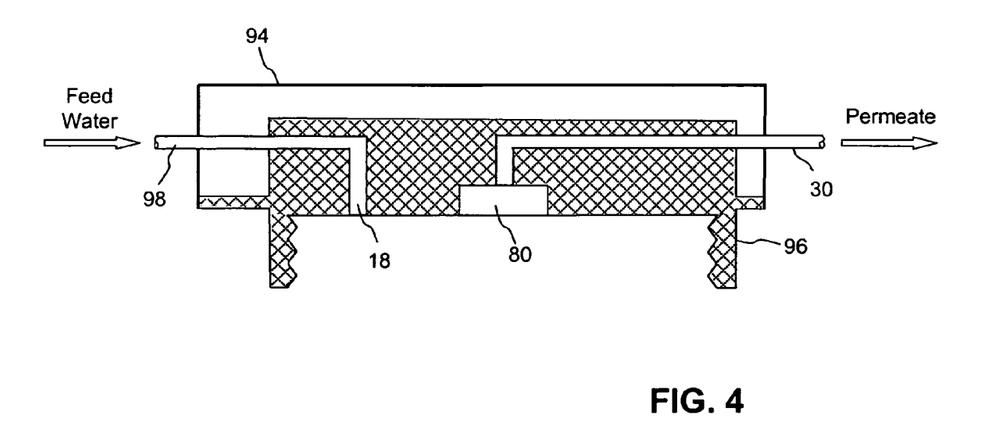
FIG. 4 is a cross-sectional view of an alternative head which may be utilized in the water purification system of FIGS. 1 and 2.

Referring now to FIG. 4, a cross-sectional view of head cover 94 partially enclosing head 96 is shown. In contrast to the head cover and head of FIG. 1, head 96 does not receive feed water via a threaded inlet. Instead, head 96 receives water via inlet 98. The inlet may be coupled to a water source such as a local water supply line, a residential or commercial water line, and other types of water filters, among others. Other than the structural change to accommodate the inlet, head 96 is essentially the same as head 14. Accordingly, head 96 is sized to receive sump 22 and the various filtering components which are contained within the sump. Filtering feed water using head 96 is accomplished in a manner similar to the techniques described above.

Figure 5:
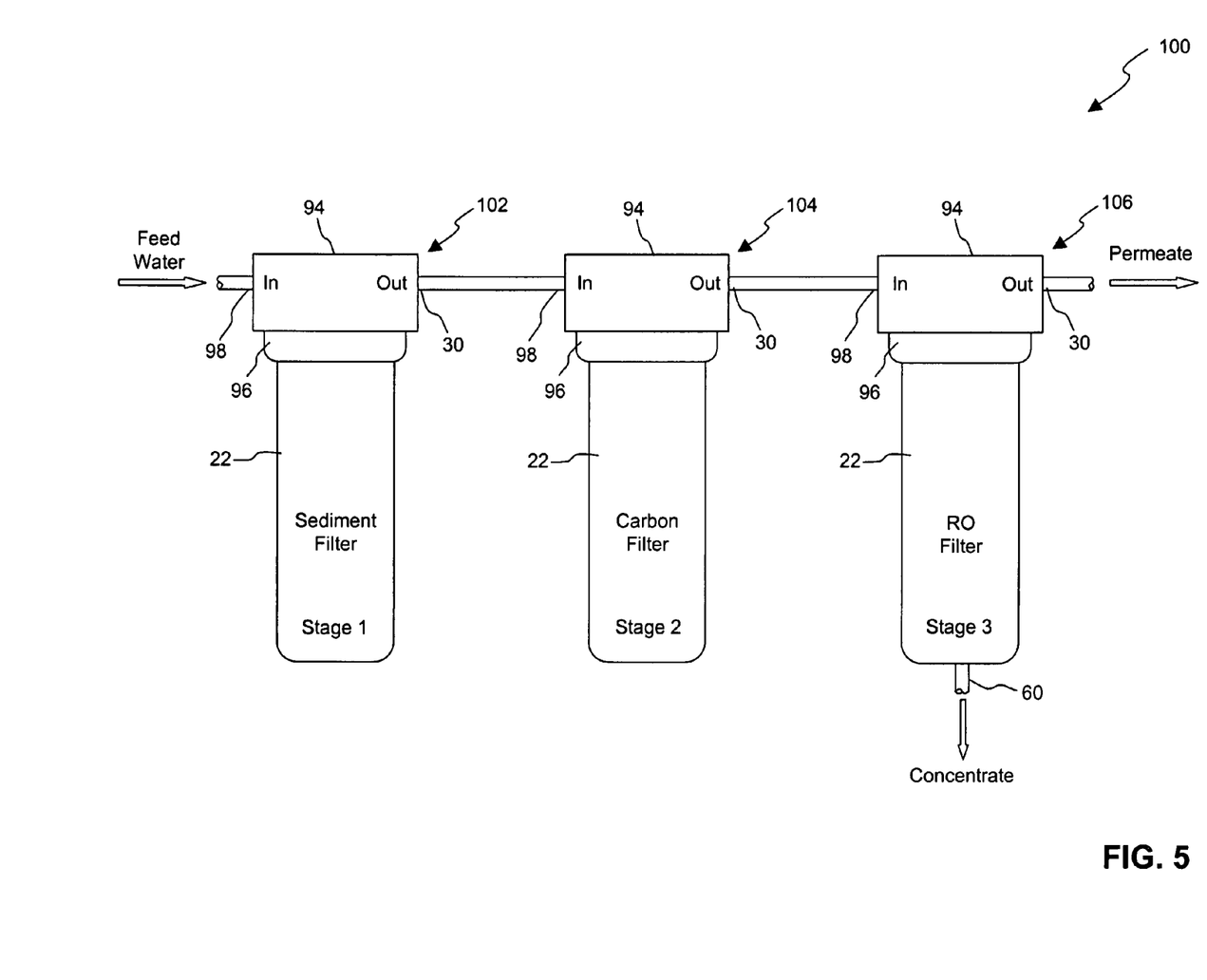
FIG. 5 is a side view of a multi-stage water purification system according to an alternative embodiment of the present invention.

FIG. 5 is a side view of multi-stage water purification system 100. System 100 is shown having three separate water purification systems, referred to simply as filters 102, 104, and 106, fluidly coupled in series. Each of these filters may be constructed using any of the various filtering components and configurations described in conjunction with FIGS. 1, 2, and 8, as modified to perform in accordance with the embodiments of this figure. Each filter comprising system 100 may include a separate and distinct type of filter. In the aggregate, system 100 will therefore filter feed water using two or more different types of filtration components.

For example, for the first filtration stage, filter 102 may be equipped with a sediment or hollow fiber filter. At the second stage, filter 104 may include only carbon filter 24, the RO filter having been omitted, while the third stage, filter 106, includes only RO filter 26. The various configurations for these filter designs have been described in conjunction with FIG. 2.

During operation, unpurified feed water enters filter 102 at inlet 98 and is filtered by a sediment or hollow fiber filter, for example, contained within that filter. The filtered water exits filter 102 at outlet 30 which provides water to second stage filter 104. Filter 104 provides filtration using a carbon filter and its water output is fed into stage three filter 106. The RO filter utilized in filter 106 provides a final stage of filtration, resulting in the generation of permeate. Undesirable concentrate may be discharged via outlet 60. Note that filters 102 and 104 do not require an outlet at the bottom of sump 22 since these filters do not generate concentrate.

The number, type, and order in which each of the various filters of system 100 are arranged may be modified as required or desired. For instance, filter 102 may alternatively be positioned last in the series of filters composing system 100. Another alternative is to place filter 104 first in the series of filters. To protect the RO filter in filter 106 against harmful chlorine, it is desirable to position filter 106 after filter 104, which contains the chlorine removing carbon filter.

Further embodiments utilize more than three filters coupled in series. One example is to position an additional sediment filter, hollow fiber filter, or carbon filter, after filter 106. Using the filter configuration shown in FIG. 5 as an example, the additional filter would receive permeate from outlet 30 of filter 106, and then filter the permeate using the particular filtering element (for example, a sediment filter) contained in that filter.

FIG. 5 has been described with regard to various filters containing a single type of filter element, but the present invention is not so limited and other configurations are possible. For instance, an individual filter, such as filter 102, may include a carbon filter as well as a sediment filter. Another alternative is to utilize a sediment filter in combination with a RO filter within a single filter, such as filter 106. Accordingly, any of the various filters described herein, including carbon filters, sediment filters, hollow fiber filters, RO filters, and the like, may be combined and arranged within a single filter, such as filter 102.

Furthermore, since multi-stage water purification system 100 is designed for under-counter or remote operation, it is not subject to the size restrictions associated with the faucet mounted system depicted in FIG. 3. Accordingly, each of the filters comprising system 100 typically have greater overall lengths as compared to the faucet mounted system. This increase in filter length allows larger, higher capacity, internal filters to be utilized.

Figure 6:
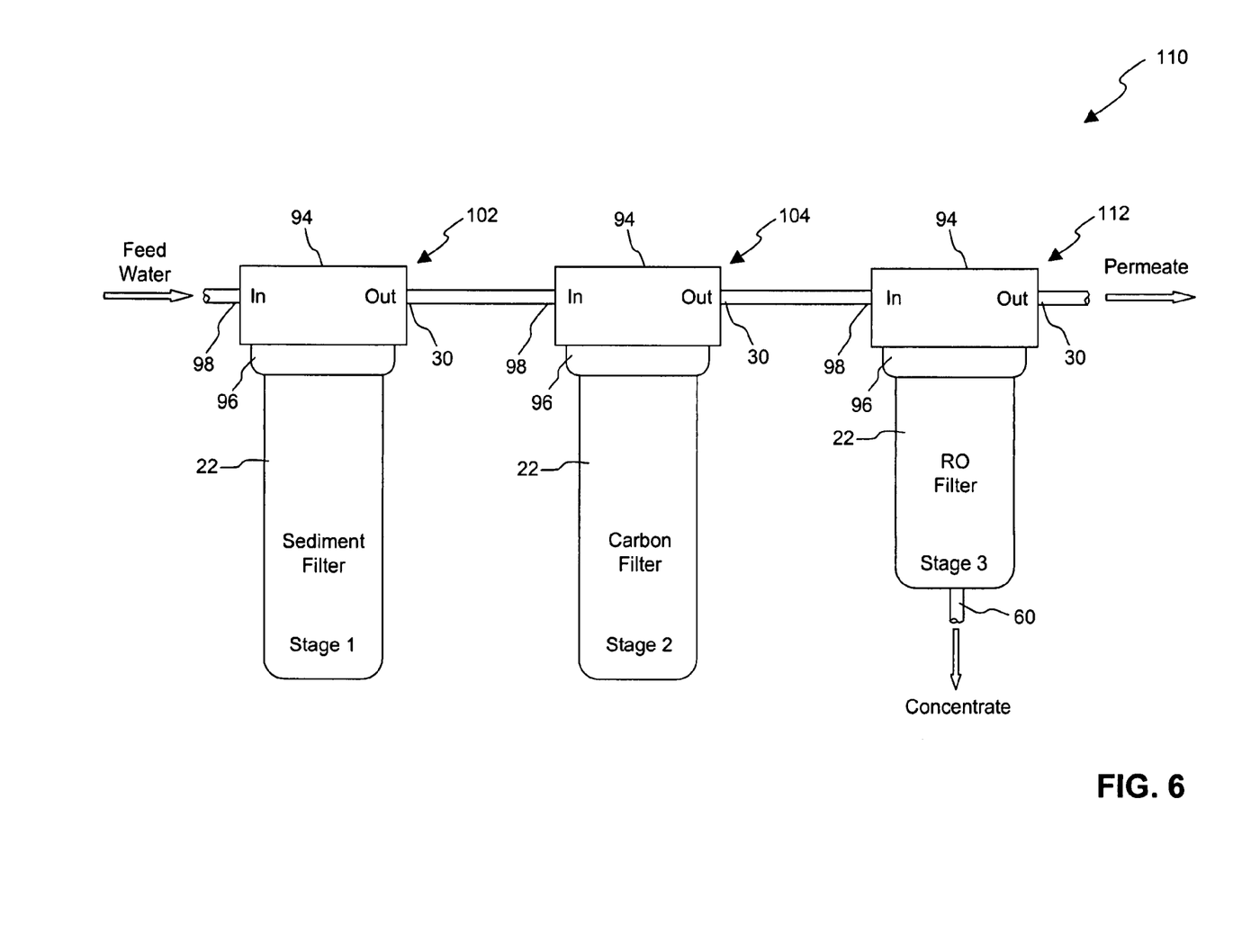
FIG. 6 is a side view of a multi-stage water purification system utilizing a faucet mountable sump.

It is common for consumers to first purchase and implement a faucet mounted system, such as the system shown in FIG. 3. After a period of time, the consumer may desire to upgrade their water purification system to a multi-stage system such as that shown in FIG. 5. In an effort to reduce the overall cost of a multi-stage system, the consumer may be provided the option of utilizing the sump and associated filtering components of their faucet mounted system, with their new multi-stage filtration system. An example of such a system is depicted in FIG. 6, which is a side view of multi-stage water purification system 110. System 110 is similar in many respects to the system shown in FIG. 5. The primary distinction is that the system of FIG. 6 includes the use of one or more filters which are designed for faucet mounted applications (filter 112), and this filter is used in conjunction with the significantly longer filters 102 and 104. In this embodiment filter 112 may contain RO filter 26, and if desired, carbon filter 24.

For example, as shown in FIG. 6, filter 112 includes a relatively smaller-in-length sump, referred to herein as a faucet mounted sump. This is possible since the faucet mounted and multi-stage water purification systems utilize the same or similarly sized heads. Accordingly, it is possible to replace relatively longer sumps designed for the multi-stage water purification system with faucet mounted sumps designed for faucet mounted systems. That is, a sump that is designed to fit heads which can be attached to household faucets will also fit heads utilized in the multi-stage water purification system. Conventional multi-stage filtration systems do not currently offer such flexibility.

Figure 7:
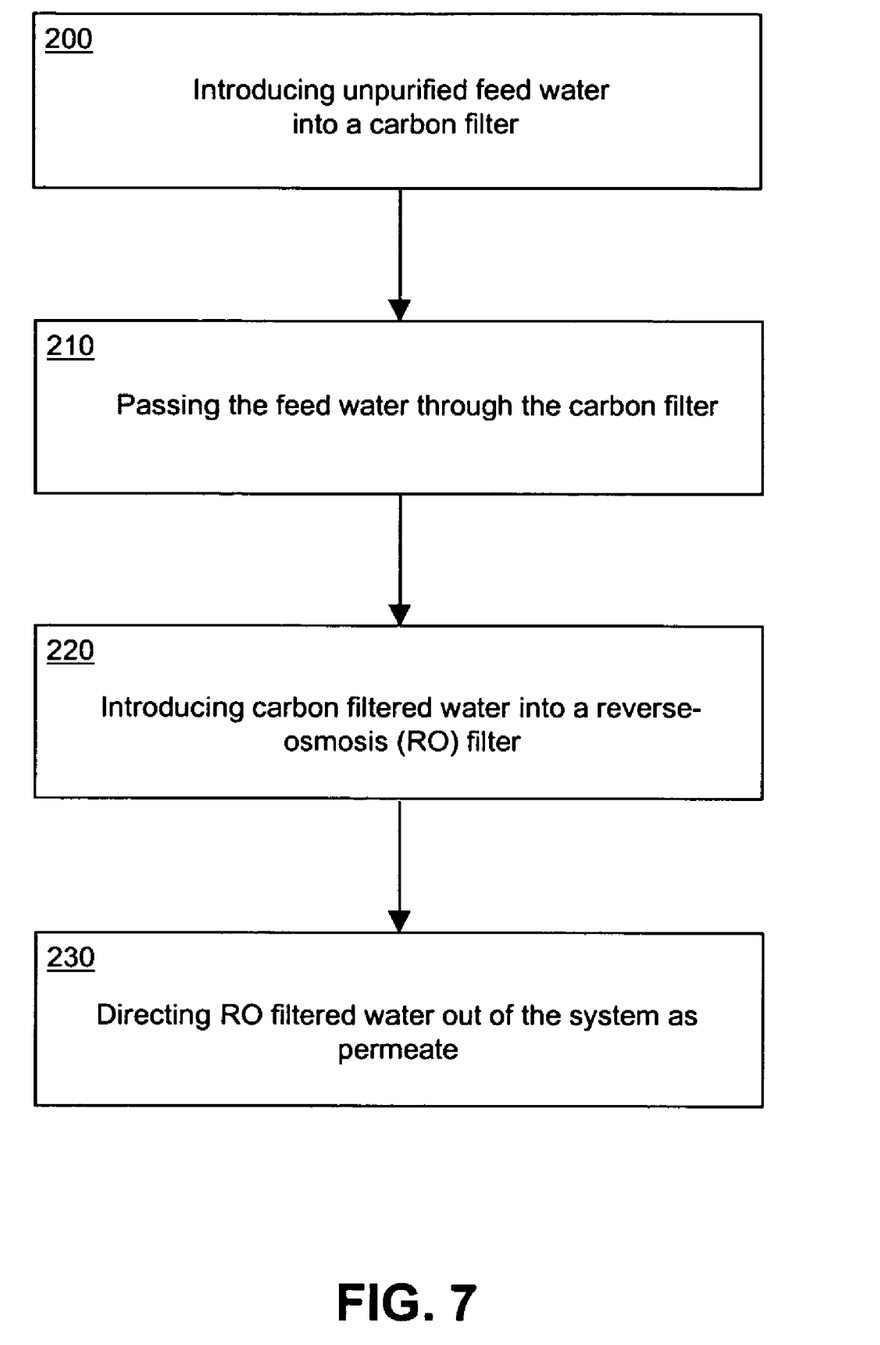
FIG. 7 is a flowchart showing a method for purifying water according to an embodiment of the invention.

FIG. 7 is a flowchart showing a method for purifying water according to an embodiment of the invention. At block 200, unpurified feed water is introduced into a carbon filter. Next, in block 210, the feed water is passed radially inwardly, or in some embodiments downwardly, thorough the carbon filter. The carbon filter water may then be introduced into a RO filter, which is typically positioned downstream and within a common sump as the carbon filter, as indicated by block 220. In block 230, the RO filtered water is directed out of a faucet-mounted water purification system as permeate.

Figure 8:
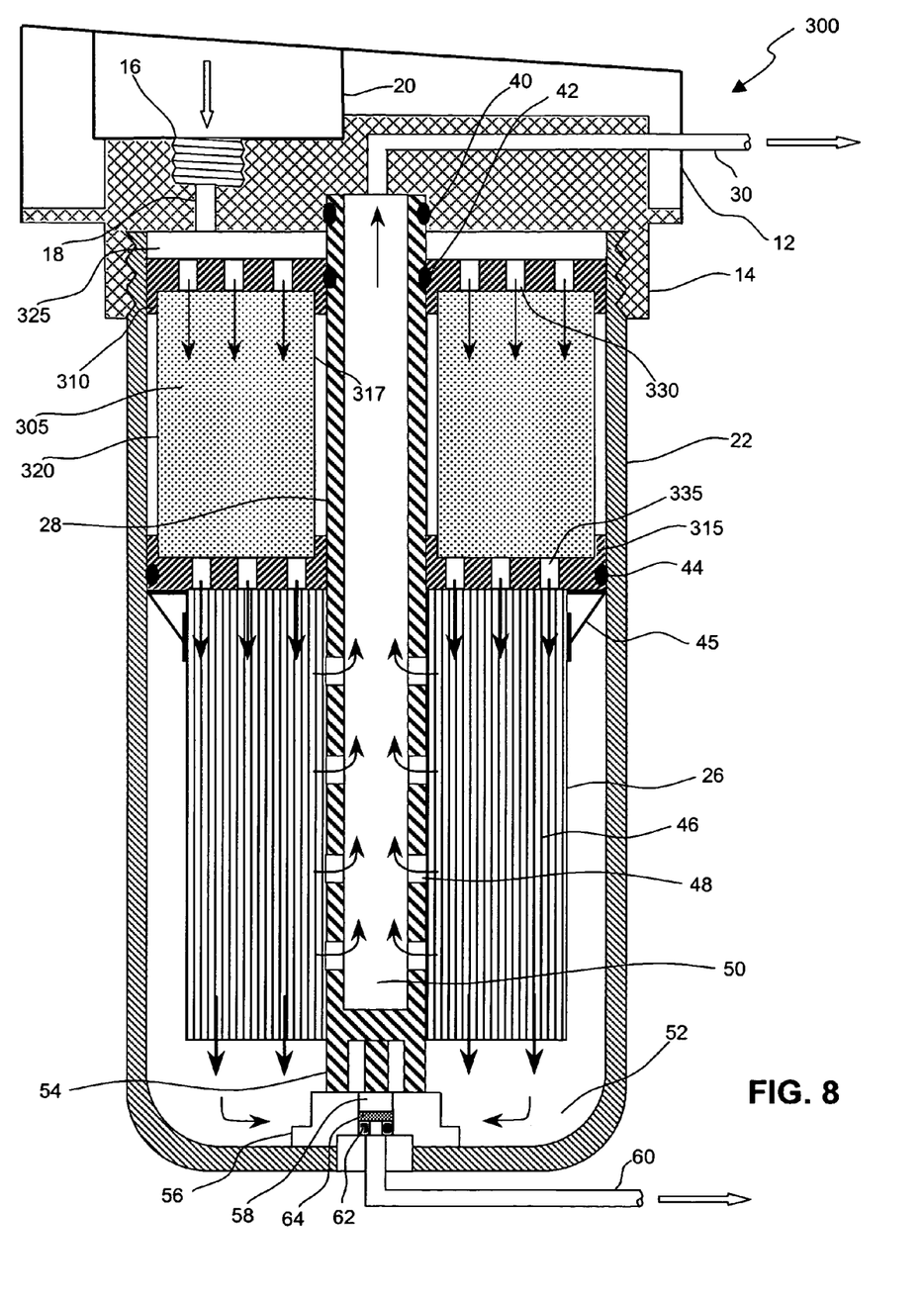
FIG. 8 is a cross-sectional view of a water purification system according to an alternative embodiment of the present invention.

FIG. 8 is a cross-sectional view of water purification system 300. System 300 is similar in many respects to water purification system 10, which is shown in FIG. 1. The primary distinction between these systems is that system 10 directs feed water radially inwardly through the carbon filter. In contrast, system 300 directs feed water downwardly through the carbon filter.

Referring still to FIG. 8, carbon filter 305 may be positioned relative to central tube 28 using the appropriate structures such as top cap 310 and bottom cap 315, but other suitable securing means can be used. Both the top and bottom caps are sized to receive carbon filter 305. Similar to the embodiment depicted in FIG. 1, carbon filter 305 may be coupled to top and bottom caps 310, 315 using any technique which will provide a substantially leak-proof coupling under the operational pressure of the system. That is, feed water should only flow downwardly through carbon filter 305, and no water should pass between the carbon filter and the outer wall of central tube 28 or the inner wall of sump 22. Top and bottom caps 310, 315 may be coupled to carbon filter 305 using any of the techniques previously discussed in conjunction with system 10.

Similar to the carbon filter of system 10, carbon filter 305 may be implemented using conventional carbon filtering devices. If desired, inner wall 317 and outer wall 320 of carbon filter 305 may be formed using water impermeable material. This would facilitate water filtered by carbon filter 305 to migrate in a downward path toward RO filter 26. Alternatively or additionally, carbon filter 305 may be sized so that inner wall 317 contacts the outer wall of central tube 28, and outer wall 320 contacts the inner wall of sump 22.

Operation of water purification system 300 operates in a manner similar in some respects to system 10. Referring still to FIG. 8, unpurified feed water is introduced to the system via a pressurized water source (not shown in this figure). The feed water flows into feed tube 18 and flows into void or cavity 325. The feed water is then introduced to carbon filter 305 using, for example, perforations or apertures 330 formed in top cap 310.

In contrast to other embodiments, the feed water of system 300 is forced downwardly through carbon filter 305 removing contaminates such as chlorine, tastes, odors, heavy metals, volatile organic compounds (VOCs), cysts, and the like. The filtered feed water flows downwardly into perforations or apertures 335 formed in bottom cap 315, and is directed into membrane 46 of the RO filter. The filtering process proceeds in a manner similar to that previously described, resulting in purified water ultimately exiting system 300 through outlet 30 and concentrate exiting the system through outlet 60.

If desired, carbon filter 305 may be replaced with other types of filtering devices which are capable of providing downward filtering of water. The various types of alternative filtering devices and materials include resins, metals, ceramics, oxides, and the like. Each of these types of materials filter particular types of contaminates as is understood by those of ordinary skill in the art of water filtration and purification systems. It is to be realized that system 300 may also be configured using any of the various filtering components and configurations described in conjunction with FIGS. 1 and 2, for example, as modified to accommodate the downward filtering process provided by carbon filter 305.

FIG. 8 shows feed water being introduced to carbon filter 305 via apertures 330, but this is not a requirement and almost any mechanism which directs feed water into the carbon filter may be used. For example, top cap 310 may alternatively be formed to include a single channel that is in communication with feed tube 18. This embodiment would not require cavity 325. Similarly, apertures 330 are also not required and almost any mechanism (for example, a single tube) which directs carbon filtered water into membrane 46 may be used. Another alternative is to omit top cap 310, bottom cap 315, or both caps. This embodiment would typically require carbon filter 305 to be sized so that it contacts the outer wall of central tube 28 and the inner wall of sump 22.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed only with reference to the claims.

What is claimed is:

1. A water purification system, comprising:
    a central tube having a perforated section;
    a carbon filter having a central aperture sized to receive a portion of said central tube;
    a reverse-osmosis (RO) filter formed around said perforated section of said central tube, said RO filter being positioned downstream from said carbon filter;
    a sump containing said carbon filter, said RO filter, and said central tube;
    a head adapted to be coupled to said sump;
    an inlet formed in said head enabling flow of unpurified feed water into said carbon filter;
    a first channel formed within said central tube enabling water to flow from said RO filter, and through said perforated section of said central tube;
    a second channel defined by an inner annular surface formed in said carbon filter and an outer surface of said central tube, said second channel enabling water filtered by said carbon filter to flow into said reverse-osmosis (RO) filter; and
    an outlet formed in said head enabling water filtered by said RO filter to flow from said first channel.

2. The system according to claim 1, wherein an upper section of said central tube is received within said head, said system further comprising:
    an O-ring positioned on said upper section, adjacent to a surface of said head.

3. The system according to claim 1, further comprising:
    a top cap in contact with a top side of said carbon filter and with an outer surface of said central tube; and
    a bottom cap in contact with a bottom side of said carbon filter and with an inner surface of said sump, said bottom cap having an aperture enabling water filtered by said carbon filter to flow into said reverse-osmosis (RO) filter.

4. The system according to claim 3, further comprising:
    an O-ring positioned on an upper section of said central tube, adjacent to a surface of said top cap.

5. The system according to claims 3, further comprising:
    an O-ring positioned on an outer surface of said bottom cap, adjacent to said inner surface of said sump.

6. The system according to claim 1, wherein said reverse-osmosis (RO) filter is spirally wrapped about said perforated section of said central tube.

7. The system according to claim 1, wherein said carbon filter is positioned within said sump enabling said unpurified feed water to flow radially inwardly through said carbon filter.

8. The system according to claim 1, wherein said reverse-osmosis (RO) filter is positioned within said sump enabling said water filtered by said RO filter to flow radially inwardly through said RO filter.

9. The system according to claim 1, wherein said reverse-osmosis (RO) filter is positioned within said sump enabling water containing contaminants filtered by said RO filter to flow downwardly through said RO filter.

10. The system according to claims 1, wherein said system is so dimensioned as to effectively couple with a faucet positioned over a basin.

11. The system according to claim 1, wherein said inlet is adapted to receive a quick disconnect coupling.

12. The system according to claim 1, wherein said sump is removably coupled to said head.

13. The system according to claim 12, wherein said sump and head comprise cooperating threading which facilitates said coupling of said sump and said head.

14. The system according to claim 1, wherein said inlet is adapted to be coupled to an inlet in communication with a source of said feed water.

15. The system according to claims 1, wherein said carbon filter and said reverse-osmosis (RO) filter are discrete structures.

16. The system according to claims 1, wherein said carbon filter and said reverse-osmosis (RO) filter are integrated, forming a single structure.

17. The system according to claim 1, further comprising:
    a discharge outlet formed in said sump enabling water and contaminants non-filtered by said reverse-osmosis (RO) filter to flow from said sump.

18. system according to claim 17, further comprising:
    a mesh screen positioned within said discharge outlet.

19. The system according to claim 17, further comprising:
a flow restrictor positioned within said discharge outlet.

20. The system according to claim 1, further comprising:
a top cap in contact with a top side of said carbon filter and with an outer surface of said central tube;
a bottom cap in contact with a bottom side of said carbon filter and with an inner surface of said sump, said bottom cap having an aperture enabling water filtered by said carbon filter to flow into said reverse-osmosis (RO) filter;
an O-ring positioned on an upper section of said central tube, adjacent to a surface of said top cap;
an O-ring positioned on an outer portion of said bottom cap, adjacent to said inner surface of said sump;
wherein said RO filter is spirally wrapped about said perforated section of said central tube and is positioned within said sump enabling said water filtered by said carbon filter to flow radially inwardly through said RO filter; and
wherein said carbon filter is positioned within said sump enabling said unpurified feed water to flow radially inwardly through said carbon filter.

21. A water purification system, comprising:
a central tube having a perforated section;
a carbon filter having a central aperture sized to receive a portion of said central tube;
a reverse-osmosis (RO) filter formed around said perforated section of said central tube, said RO filter being positioned downstream from said carbon filter;
a sump containing said carbon filter, said RO filter, and said central tube;
a head adapted to be coupled to said sump;
a head cover on said head, said head cover being configured to removably couple said system directly to a water dispensing faucet and having an inlet formed to enable flow of unpurified feed water from said faucet into said carbon filter;
a first channel formed within said central tube enabling filtered water to flow from said RO filter, and through said perforated section of said central tube;
a second channel defined by an inner annular surface formed in said carbon filter and an outer surface of said central tube, said second channel enabling water filtered by said carbon filter to flow into said reverse-osmosis (RO) filter; and
an outlet formed in said head enabling water filtered by said RO filter to flow from said first channel.

* * * * *